July 6, 1926.

W. L. WALKER

SIGNAL RECEIVING SYSTEM

Filed Jan. 4, 1921

Inventor
William L. Walker.
by Roberts Roberts Cushman
his Attys

July 6, 1926.
W. L. WALKER
1,591,252
SIGNAL RECEIVING SYSTEM
Filed Jan. 4, 1921
2 Sheets-Sheet 2
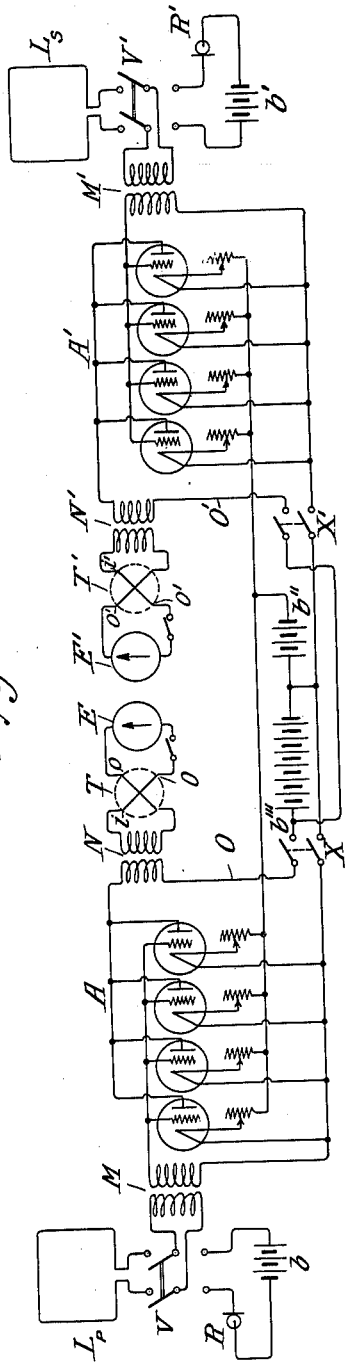
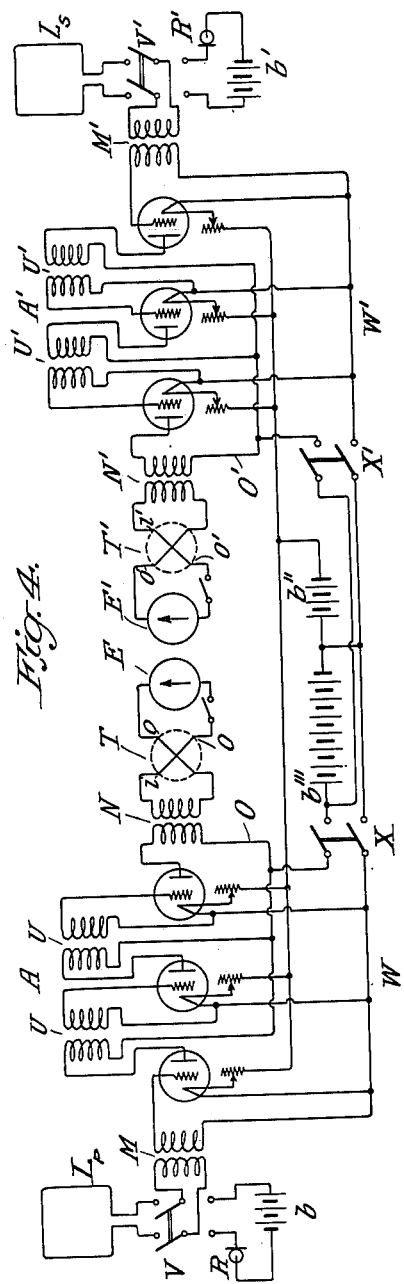
INVENTOR.
WILLIAM L. WALKER
BY Sheffield Betts
HIS ATTORNEYS.

Patented July 6, 1926.

1,591,252

UNITED STATES PATENT OFFICE.

WILLIAM L. WALKER, OF NEW YORK, N. Y., ASSIGNOR TO WALKER SIGNAL & EQUIPMENT CORPORATION, OF NEW YORK, N. Y., A CORPORATION OF DELAWARE.

SIGNAL RECEIVING SYSTEM.

Application filed January 4, 1921. Serial No. 434,962.

This invention relates to a method and apparatus the principal use of which is to determine the direction of a source of radiant energy such as sound, Hertzian or magnetic waves, light, heat, etc., and is a continuation in part of my prior Patent No. 1,492,589, May 6, 1924, for visual and aural determination of direction and distance of sound.

In navigation, for example, it is desirable to determine the direction of sound signals and other sources of sound such as the signals or sounds given off by other vessels. It has also been proposed to lay a cable along the bottom of a waterway and to set up a magnetic field about the cable, each vessel navigating the waterway having a magnetic system affected by the field to indicate the position of the vessel relative to the cable. And in radio transmission, on land and at sea, it is frequently desirable accurately to determine the direction from which certain Hertzian waves are received.

Various and sundry systems for effecting such indications have been used with some success. For example, sound or magnetic receivers have been placed on opposite sides of a vessel to determine the position of the vessel relative to the source of radiant energy (another ship, a signal station or a magnetic cable, e. g.) by comparing the relative effects of the source on the respective receivers, the receiver farther from the source or screened by a portion of the vessel receiving less energy than the receiver nearer the source or unscreened. Such systems have had many defects among which may be mentioned the following:

The energy reaching the receivers is usually very small (inasmuch as it is dissipated in all directions from the source) and consequently it has been impossible to compare with any degree of accuracy the quantities of energy reaching the respective receivers. This is especially true where each energy receiver is connected to a telephone receiver or the like and where the operator must approximate the difference in the sounds produced by the telephones.

In order to increase the amount of energy received it has been proposed to employ a group or battery of receivers instead of a single receiver at each location, e. g. on each side of a vessel, and to add the energy received by the respective receivers of each group. However, owing to the wave propagation of the energy, this arrangement produces pulsations in the receivers, and when attempting to add the various components of pulsating energy received it is practically impossible to make the nodes coincide, due to slight differences in the constants of the respective receivers and to the fact that the receivers are at more or less unequal distances from the source. Consequently the components at times may subtract instead of add, and the resultant is not a true summation.

Furthermore, instruments for measuring or comparing pulsating or alternating currents are not as sensitive or accurate as instruments for measuring what are ordinarily called direct currents.

The objects of the present invention are to overcome the defects of prior systems of the character referred to and to produce a system which is sensitive and accurate, which affords an automatic comparison between the components of energy received by the respective receivers, which permits the use of receivers cumulatively in groups or batteries, which permits the use of unidirectional indicators, and which is generally superior.

Instead of comparing the components of energy in pulsating form, e. g. in the form of pulsating unidirectional or alternating current, the present invention contemplates first producing substantially steady components of energy proportional to the pulsating components received by the use of a thermocouple rectifier or any other form of rectifier and then comparing these respective steady components either by observing the indications of two or more direct current indicators, one for each component, or preferably performing the comparison automatically by means of one or more differentially-actuated direct-current indicators receiving and actuated by the resultant energy of the component currents. In this way the components of energy from a group or battery of receivers may be readily and accurately added after being corrected or converted into steady unidirectional energy. While still in alternating or other pulsating form, the components of energy are preferably amplified, In the illustrated embodiment of the invention:—

Fig. 3 is a diagram of a simplified circuit like that of Fig. 1, as applied to one receiver on each side of a vessel, and Fig. 4 is a similar diagram showing the audions or thermionic tubes arranged in successive stages or in series for greater amplification.

Figure 1:
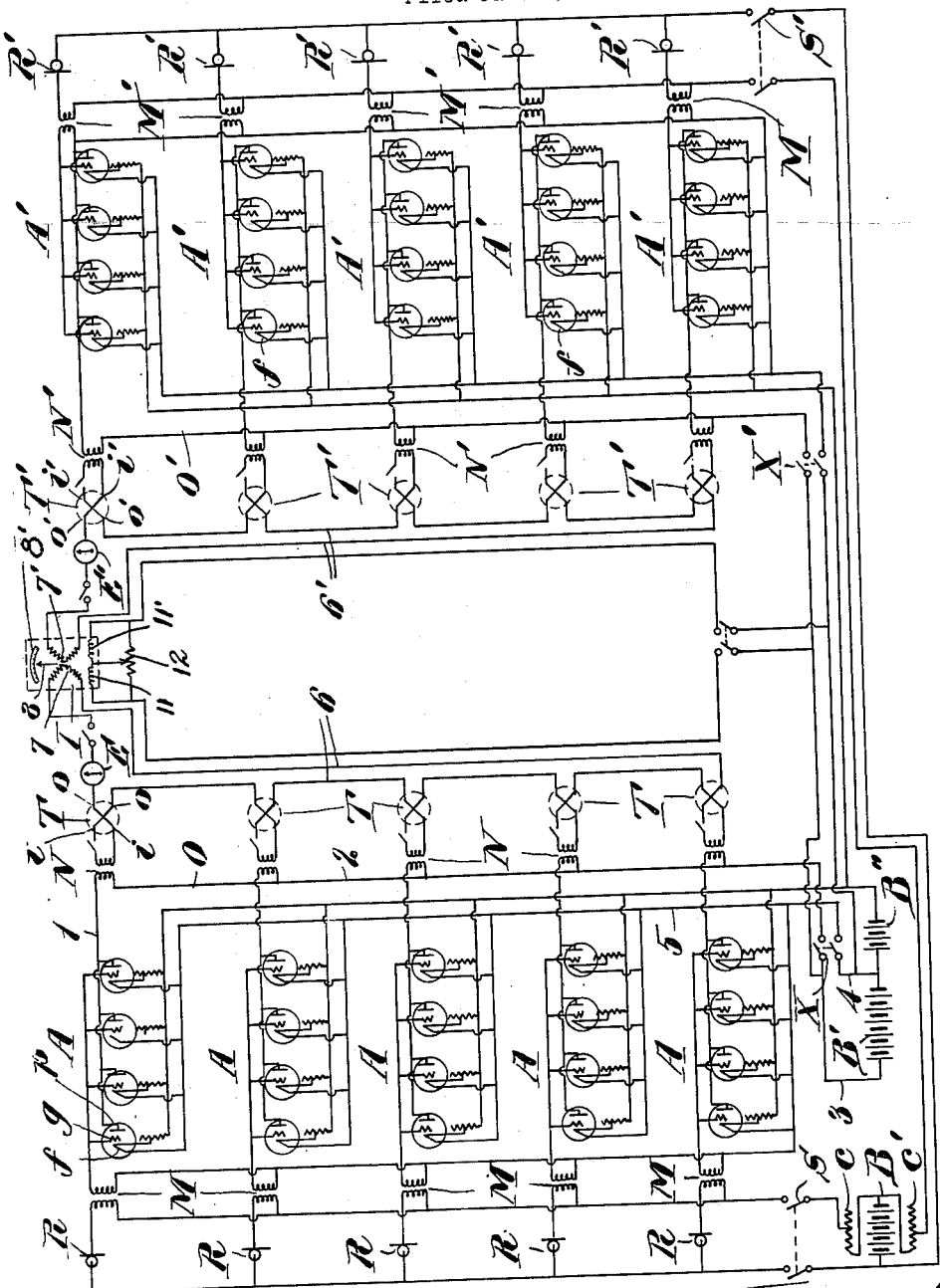
Fig. 1 is a diagrammatic view of one form of the entire system.

The particular embodiment of the invention chosen for the purpose of the main illustration comprises two groups of sound receivers R and R', the respective receivers of each group being placed in juxtaposition and the two groups being disposed in spaced relationship as, for example, on opposite sides of a ship, and may be placed at relatively separated positions along the sides of the ship, such as forward and aft of the waist line or beam. The sound receivers are connected to transformers M and M' and to battery B. Switches S and S' are provided to connect the groups of receivers to the battery B. Variable resistances C and C' are provided to regulate the current for each group of receivers. The secondaries of the transformers M and M' are respectively connected to audion sets A and A', each of the audion sets comprising one or more audions connected in parallel to give a larger current output or so that an average amplification of several receivers or the average amplification of audions of different characteristics may be obtained, or they may be connected in two or more stages in the well known way to give greater amplification as shown in Fig. 4. The cathodes $f$ of the audions are heated by battery B" and the output circuits O and O' of the audion sets are supplied with current by battery B', switches X and X' being provided to control the output circuits. The output circuit of the upper left-hand audion set, for example, may be traced as follows: From the heated cathodes $f$ through the grids $g$, to the plates $p$, thence along conductor 1 to the transformer N, thence along conductor 2 to switch X, thence along conductor 3 to battery B', thence along conductor 4 to switch X, and thence along conductor 5 back to the heated filaments $f$. The secondary of each transformer N or N' is connected to the respective input terminals $i$ or $i'$ of one of the thermocouples T or other rectifiers. The output terminals $o$ and $o'$ of the thermocouples are connected so that the thermo-positive and thermo-negative junction of each is in series in like directions, in each of the circuits 6 and 6' respectively, these circuits leading to the differential windings 7 and 7' respectively of the differential indicator I. The circuits 6, 6' severally include current indicators E, E' for which any usual current-measuring galvanometer or ammeter of a sensitive type will serve. These instruments independently indicate the current flowing in the respective circuits 6, 6', and form a check on the instrument I when the needle 8 is in the zero position owing to equal currents in both sides of the system.

Figure 2:
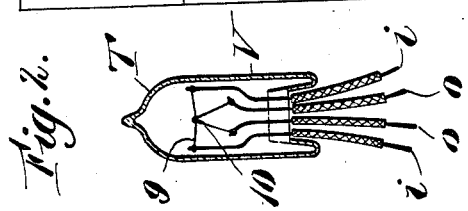
Fig. 2 is a sectional view of a vacuum thermocouple employed as an element of the system.

The thermocouples T are preferably of the type illustrated in Fig. 2 which comprises a vacuum tube V containing a filament 9 heated by the current in the input circuit and contacting with a thermocouple 10 in the output circuit. The heat conducted or radiated to the thermo-junction 10 from the heated filament 9 generates a direct current in the output circuit proportional to the temperature of the filament 9 and therefore proportional to the current in the input circuit. Thus by supplying an alternating current to the input circuit a steady unidirectional current proportional to the input is produced in the output circuit. The voltages of the unidirectional currents generated by the thermocouples of each set T and T' respectively, are added together inasmuch as the output terminals of the thermocouples of each set are connected in series.

The indicating instrument I may be of any suitable type having a pointer 8 playing over a scale 8', the pointer being controlled by the coils 7 and 7' within the fields of the magnetizing coils 11 and 11', whose currents are balanced by the rheostat 12 so that when the coils 7 and 7' are equally energized the pointer stands at the middle of the scale as indicated in Fig. 1, and so that the pointer will be deflected to one side when the right-hand coil is energized more than the left-hand coil; and to the other side when the left-hand coil is energized more than the right-hand coil, the degree of deflection being a function of or proportional to the ratio of the energization in the two coils. By suitably calibrating the scale 9, the pointer will indicate at any instant the direction of the source of energy as will appear from the following description of the operation of the system.

Energy received by the receivers R and R' will produce pulsating unidirectional currents in the primaries of the transformers M and M' respectively. The pulsating currents in the primaries of the transformers M and M' produce alternating currents in the secondary of the transformers M and M'. These alternating currents are amplified by the audions A and A' and may be again transformed by the transformers N and N', or employed by any other form of connection to excite the thermocouples T and T'. These alternating currents heat the filaments 9 of the thermocouples T and T' thereby generating unidirectional current in the output circuits of the thermocouples, these uni-directional currents adding in the series circuits 6 and 6' and thence passing through the indicators E, E' and the coils 7 and 7' respectively of the indicator I.

Assuming the source of energy to be equidistant from the two groups or batteries of receivers R and R', the receivers would be affected substantially equally and would therefore produce currents whose pulsations have substantially equal magnitude; consequently the alternating currents produced by the transformers M and M' would be substantially equal; likewise the amplified currents induced in the secondaries of the transformers N and N' will be equal. Consequently the currents produced by the thermocouples will be approximately equal and the indicator pointer 8 will stand in the middle of the scale as indicated in Fig. 1. If the system were located on a ship and the source of energy were from another ship, or other source, the indication of currents at E, E', with no deflection at 8, would mean that the source of sound was dead ahead or astern. If the energy emanated from a cable or other suitable device at the bottom of the channel being navigated this indication would indicate the ship to be directly over the cable.

However, if the source of energy were displaced to port or starboard one set of receivers would receive more energy than the other, partly due to the difference in distance between the source and the respective groups of receivers, but principally due to the fact that one group of the receivers is so positioned on a ship that they are screened from the source of energy by portions of the ship, and the needle 8 of this instrument I will be deflected accordingly to the right or left.

In Fig. 3, the circuits of Fig. 1 have been simplified to more clearly illustrate the above description, the group of receivers being replaced by one only on each side of the ship or at similarly located points in other applications of the invention.

In this figure the microphones, amplifiers, transformers, thermocouples and ammeters are connected exactly as shown in Fig. 1, except separate batteries $b$ and $b'$ are used with the microphones and the instrument I has been omitted. It will be readily seen by consideration of Fig. 3, that the galvanometers or ammeters E and E' may be used to determine the distance of the ship or receiving station from the source of sound or other form of radiated energy to which the receivers used are adapted to respond. When the source of sound is dead ahead that is, the ship is pointed directly toward the source of sound and movement is toward or away from such source, the deflection of the needles of the ammeters E and E' will increase or decrease according to the distance, since the magnitude of deflections are proportional to the energy received and the latter is a function of the distance between the receivers and the source of sound or energy. When the sound source is dead ahead the instruments E and E' will indicate the same amount of received energy. Then from a calibration curve showing the relation between the amount of deflections and the distance from the source of sound, the said distance may be readily determined. It is obvious that the galvanometers may be calibrated and provided with scales to indicate distance directly.

While the receivers R and R' have been shown diagrammatically in the drawing as being microphonic sound receivers it is to be understood from the foregoing description that they may be wireless receivers, coils for responding to magnetic flux, light or heat receivers, or any other detectors operating according to any desired or known principle to indicate the presence and intensity of radiant energy.

It will be understood that while the indicators E, E', in the respective circuits are useful to show the intensity of energies producing a balance and therefore no indication, at the indicator I, the system may be usefully operated with the indicator I only, and without said indicators E, E'. It will also be understood that the indicators E, E' may be placed near each other for visual comparison as shown, and in that case that the indicator I may be dispensed with without rendering the system inoperative thereby making the galvanometers E and E' more sensitive to the same amount of received energy by eliminating the resistance of the differential indicator I, a deflection for instance, of the indicator E only, or its deflection to a greater extent than the indicator E' showing the source of the disturbance to be to port.

Fig. 4 is similar to Fig. 3, but illustrates the three-element vacuum tubes or audions arranged in series or cascade form for producing greater amplification rather than an average result obtained by the arrangement shown in Fig. 3. In this figure the intervalve transformers D and D' are interposed between the respective audions in the usual manner.

The microphones R and $R_1$ may be connected with the transformers M and M' by means of the double-throw, double-pole switches V and V' of which the second set of contact points serve to permit the coils or loops $L_p$ and $L_s$ to be substituted therefor as above suggested. While I prefer to compare the energies indicated by integrating them against each other by the instrument I, any instrument or instruments capable of indicating by usual comparison or otherwise severally different degrees of electrical disturbance in the circuits 6, 6' is within my invention.

I claim:—

1. The method of determining the direction of a source of radiant energy which comprises converting portions of the energy at spaced points respectively, into pulsating currents, the pulsations of the currents having amplitudes proportional to the intensity of the energy at said points respectively, converting said pulsating currents into substantially continuous currents proportional to said amplitudes respectively, and comparing said continuous currents to determine the relative intensities of said portions of energy.

2. The method of determining the direction of a source of radiant energy which comprises converting portions of the energy at spaced points into pulsating currents respectively, the pulsations of the currents having amplitudes proportional to the intensity of the energy at said points respectively, producing amplified pulsating currents proportional to said currents respectively, converting said amplified pulsating currents into substantially continuous currents proportional to said amplitudes respectively, and comparing said continuous currents to determine the relative intensities of said portions of energy.

3. The method of determining the direction of a source of radiant energy which comprises converting portions of the energy at spaced points into pulsating currents respectively, the pulsations of the currents having amplitudes proportional to the intensity of the energy at said points respectively, converting said pulsating currents into substantially continuous currents proportional to said amplitudes respectively, and automatically differentiating said continuous currents.

4. The method of determining the direction of a source of radiant energy which comprises converting portions of the energy at spaced points into pulsating currents respectively, the pulsations of the currents having amplitudes proportional to the intensity of the energy at said points respectively, producing amplified pulsating currents proportional to said currents respectively, converting said amplified pulsating currents into substantially continuous currents proportional to said amplitudes respectively, and differentially applying said continuous currents to a differential direct-current indicator.

5. The method of determining the direction of a source of radiant energy which comprises separately converting portions of the energy emanating to each of two spaced regions into pulsating currents respectively, the pulsations of the currents from each region having amplitudes proportional to the intensity of the energy reaching the respective regions, producing by said pulsating currents substantially constant currents proportional to said amplitudes respectively, adding the constant currents from each region, and comparing the added currents from the two regions respectively.

6. The method of determining the direction of a source of radiant energy which comprises separately converting portions of the energy emanating to each of two spaced regions into pulsating currents respectively, the pulsations of the currents from each region having amplitudes proportional to the intensity of the energy reaching the respective regions, producing an amplified pulsating current proportional to each of said currents, producing by each amplified current a substantially constant current, adding the constant currents from each region, and automatically comparing the added currents from the two regions respectively.

7. Means for determining the intensities and directions of radiant energy transmitted through natural media comprising, a plurality of circuits each including a radiant energy receiver, devices for converting the energy absorbed by said receivers into constant currents proportional to the amounts of said energy, and an indicator responsive to said currents.

8. Means for determining the intensities and directions of radiant energy transmitted through natural media comprising, a plurality of circuits each including a radiant energy receiver, devices for amplifying and converting the energy absorbed by said receivers into constant currents proportional to the amounts of said energy, and an indicator responsive to said currents.

9. Means for determining the intensities and directions of radiant energy transmitted through natural media, comprising a plurality of circuits each including a radiant energy receiver, a rectifier for converting the energy absorbed into unidirectional pulsating currents, a device for producing constant currents proportional to said currents, and an indicator responsive to said constant currents.

10. Means for determining the intensities and directions of radiant energy transmitted through natural media, comprising a plurality of circuits each including a radiant energy receiver, a rectifier for converting the energy absorbed, into unidirectional pulsating currents, a thermocouple for producing constant currents proportional to said pulsating currents, and a current indicator in circuit with said thermocouple.

11. Means for determining the intensities and directions of radiant energy transmitted through natural media, comprising a plurality of circuits each including a radiant energy receiver, an electron valve for amplifying and converting the energy absorbed into unidirectional currents, a thermocouple for producing currents proportional to said unidirectional currents and a current indicator in circuit with said thermocouple.

12. A system for determining the direction and distance of a source of radiant energy, comprising radiant energy receivers at spaced points, devices for transforming the energy absorbed by said receivers into constant electric currents, and current indicating means connected with said devices respectively for indicating and comparing the intensities of the energy absorbed by said receivers.

13. A system for determining the direction and distance of a source of radiant energy, comprising vibratory energy receivers at spaced points, devices for transforming said vibratory energy into constant electric currents, and current indicating means connected with said devices respectively for indicating and comparing the intensities of the energy absorbed by said receivers.

14. A system for determining the direction and distance of a source of radiant energy comprising vibratory energy receivers at spaced points, rectifiers for transforming said vibratory energy into unidirectional pulsating electric currents, devices for producing constant currents by said pulsating currents, and current indicating means connected with said devices for indicating and comparing the intensities of the energy absorbed by said receivers.

15. A system for determining the direction and distance of a source of radiant energy comprising vibratory energy receivers at spaced points, electron valves for amplifying and transforming the energy absorbed by said receivers, devices for producing constant currents from the currents produced by said valves, and current indicating means connected with said devices for inicating and comparing the intensities of the energy absorbed by said receivers and amplified by said valves.

16. A system for determining the direction and distance of a source of radiant energy comprising vibratory energy receivers at spaced points, electron valves for amplifying and transforming the energy absorbed by said receivers, transformers in the output circuits of said valves, and current indicating means electrically connected with the secondaries of said transformers for indicating and comparing the intensities of the energy absorbed by said receivers and amplified by said valves.

17. A system for determining the direction and distance of a source of radiant energy comprising vibratory energy receivers at spaced points, electron valves for amplifying and transforming the energy absorbed by said receivers, transformers in the output circuits of said valves, devices for producing unidirectional currents from the output coils of said transformers, and current indicating means in circuit with said devices for indicating and comparing the intensities of the energy absorbed by said receivers and amplified by said valves.

18. A system for determining and permitting following a linear source of radiant energy comprising a plurality of radiant energy receivers, each receiver being located at relatively separated substantially symmetrical points, rectifiers for converting the energy absorbed by said receivers into unidirectional pulsating currents, devices for producing constant currents proportional to said currents, and means for indicating and comparing the directions of the source of energy from the receivers respectively through the medium of the currents produced by said devices.

19. A system for determining and permitting following a linear source of radiant energy comprising a plurality of radiant energy receivers, each receiver being located at relatively separated substantially symmetrical points, rectifiers for converting the energy absorbed by said receivers into unidirectional pulsating currents, thermocouples for producing constant currents proportional to said pulsating currents, and means for indicating and comparing the directions of the source of energy from the receivers respectively through the medium of the currents produced by said thermocouples.

20. A system for determining and permitting following a linear source of radiant energy comprising a plurality of radiant energy receivers, each receiver being located at relatively separated substantially symmetrical points, electron valves for amplifying and converting the energy absorbed, into unidirectional pulsating currents, thermocouples for producing currents proportional to said pulsating currents and means for indicating and comparing the directions of the source of energy from the receivers respectively, through the medium of the currents producd by said thermocouples.

21. The method for determining and permitting following the direction of a linear source of radiant energy which comprises, converting the energy existing at a plurality of relatively spaced points into constant currents and comparing the energy existing at each point of the said points through a comparison of the relative strengths of the constant currents produced respectively thereby.

22. The method for determining and permitting following the direction of a linear source of radiant energy, which comprises, converting the energy existing at a plurality of points into unidirectional pulsating currents, amplying said currents, producing constant currents by the action of said pulsating currents and comparing the energy existing at each of the said points through a comparison of the relative strength of the constant currents produced respectively by said pulsating currents.

23. The method for determining and permitting following the direction of a linear source of radiant energy which comprises, converting the energy existing at a plurality of points into unidirectional pulsating currents, amplifying said currents, producing heat by said currents, measuring the amount of heat produced and comparing the quantities of said heat representing the energy existing at each of the said points.

24. The method for determining and permitting following the direction of a linear source of radiant energy which comprises, converting the energy existing at a plurality of points into unidirectional pulsating currents, amplifying said currents, producing heat by said currents, producing thermoelectric currents by said heat and comparing the energy existing at each of the said points through a comparison of the relative strengths of said thermo-electric currents.

25. The method of determining the direction of a source of radiant energy which comprises converting portions of energy at spaced points respectively, into variable electric currents, the variations of which have amplitudes proportional to the intensity of energy at said points respectively, transforming said currents into similar currents of increased voltage passing the same through the input circuits of thermionic tubes, transforming the outputs of said tubes into alternating currents of suitable voltage, and comparing the effects of said transformed currents by suitable instruments to determine the relative intensities of said portions of energy.

26. Apparatus for determining the direction of a source of radiant energy which comprises radiant energy receivers located at spaced points, devices for converting the energy absorbed by said receivers into variable electric currents, the variations of which have amplitudes proportional to the intensity of the received energy respectively, transformers for transforming said currents into alternating currents, thermionic tubes having their input elements connected with said transformers, transformers connected with the output elements of said tubes, rectifying means connected with the last named transformers and indicating means connected with said rectifying means, respectively.

Signed by me at Boston, Massachusetts, this seventeenth day of December, 1920.

WILLIAM L. WALKER.